(12) United States Patent
Pacolt (10) Patent No.: US 8,851,548 B2
(45) Date of Patent: Oct. 7, 2014

(54) FLOOR LATCH MOUNTED TO A SEAT BOTTOM AND COMPENSATING FOR VEHICLE STRIKER HEIGHT VARIATION

(75) Inventor: Stanley D. Pacolt, Clarkston, MI (US)

(73) Assignee: BAE Industries, Inc., Warren, MI (US)

( * ) Notice: Subject to any disclaimer, the term of this patent is extended or adjusted under 35 U.S.C. 154(b) by 283 days.

(21) Appl. No.: 13/362,768

(22) Filed: Jan. 31, 2012

(65) Prior Publication Data

US 2012/0205959 A1 Aug. 16, 2012

Related U.S. Application Data

(60) Provisional application No. 61/441,302, filed on Feb. 10, 2011.

(51) Int. Cl.
*B60N 2/02* (2006.01)
*B60N 2/015* (2006.01)

(52) U.S. Cl.
CPC ................... *B60N 2/01583* (2013.01)
USPC ...................................... 296/65.03

(58) Field of Classification Search
CPC ............. B60N 2/015; B60N 2/01508; B60N 2/01516; B60N 2/02; B60N 2/14; B60N 2/0893
USPC ...................................... 296/65.03
See application file for complete search history.

(56) References Cited

U.S. PATENT DOCUMENTS

| | | | |
|---|---|---|---|
| 3,743,350 A * | 7/1973 | Allen | 297/94 |
| 5,224,750 A | 7/1993 | Clark et al. | |
| 5,547,242 A | 8/1996 | Dukatz et al. | |
| 5,904,404 A | 5/1999 | McCulloch et al. | |
| 6,012,747 A | 1/2000 | Takamura et al. | |
| 6,039,401 A | 3/2000 | Rus | |
| 6,213,525 B1 | 4/2001 | Nicola | |
| 6,412,849 B1 | 7/2002 | Fast | |
| 6,644,744 B2 | 11/2003 | Seibold | |
| 6,860,560 B2 * | 3/2005 | Chiu et al. | 297/367 R |
| 6,945,585 B1 | 9/2005 | Liu et al. | |
| 7,222,907 B2 | 5/2007 | Lutzka et al. | |
| 7,296,840 B2 | 11/2007 | Martone et al. | |
| 7,434,862 B2 | 10/2008 | Lutzka et al. | |
| 7,500,707 B2 | 3/2009 | Lutzka et al. | |
| 7,703,828 B2 * | 4/2010 | O'Connor et al. | 296/65.01 |

(Continued)

FOREIGN PATENT DOCUMENTS

WO  WO 2010107776 A1 * 9/2010 ............... B60N 2/15

*Primary Examiner* — Glenn Dayoan
*Assistant Examiner* — Paul Chenevert
(74) *Attorney, Agent, or Firm* — Gifford, Krass, Sprinkle, Anderson & Citkowski, P.C.; Douglas J. McEvoy (57) ABSTRACT

A height compensating latch supported upon an underside of a rotatable vehicle seat and including a pair of spaced apart support plates, between which are pivotally supported a hook rotatable between a floor supported striker engaging position and a further position permitting rotation of the seat. A cam is also supported between the plates and triggers actuation of the hook. A pair of pliant and resilient portions are supported within mounting apertures associated with the plate, an open interior of each resilient portion receiving a mounting fastener for securing the plate to the seat and providing a degree of height compensation between the latch and striker. The pliant and resilient portions include a pair of rubberized bushings sandwiched between the support plates, each of the bushings further including an integrally formed grommet supported within first and second aligning pairs of mounting apertures associated with the plates.

20 Claims, 12 Drawing Sheets

(56) References Cited

U.S. PATENT DOCUMENTS

| | | |
|---|---|---|
| 7,959,205 B2 | 6/2011 | Paing et al. |
| 8,672,385 B2 * | 3/2014 | Matsumoto et al. ....... 296/65.01 |
| 8,702,176 B2 * | 4/2014 | Blackburn et al. ......... 297/463.1 |
| 2004/0174037 A1 | 9/2004 | Frazier et al. |
| 2004/0183327 A1 | 9/2004 | Yokoyama et al. |
| 2007/0057527 A1 * | 3/2007 | Endo et al. .................. 296/65.13 |
| 2012/0038201 A1 | 2/2012 | Blackburn et al. |
| 2012/0319425 A1 * | 12/2012 | Reimann .................... 296/65.03 |

* cited by examiner

FLOOR LATCH MOUNTED TO A SEAT BOTTOM AND COMPENSATING FOR VEHICLE STRIKER HEIGHT VARIATION

CROSS-REFERENCE TO RELATED APPLICATIONS

This Application claims the benefit of U.S. Provisional Application 61/441,302 filed on Feb. 10, 2011.

BACKGROUND OF THE INVENTION

1. Field of the Invention

The present invention is generally directed a floor latch secured to an underside of a pivoting seat bottom. More specifically, the present invention discloses a floor latch construction compensating for variations in a vehicle floor mounted striker for engaging the seat in a design position.

2. Description of the Relevant Art

The prior art includes floor release latches such as for use with a vehicle seat. An example of this is disclosed in U.S. Pat. No. 7,222,907, to Lutzka et al., in which a latch plate is rotatably secured to the seat and engages a floor mounted striker. A cam is rotatably secured to the seat and defines a shoulder biasingly seating against a support surface of the latch plate. A lever actuates the cam away from the support surface. A coil spring extends between the cam and a location of the latch plate offset from its pivot point. Forward pivoting of the seat occurs upon the shoulder separating from the from the support surface, the coil spring causing the latch plate to further rotate in a disengaging direction relative to the striker and upon the coil spring exceeding an over center position relative to the pivot point of rotation of the plate. Additional examples of floor latch assemblies include such as those disclosed in U.S. Pat. No. 7,959,205, to Paing et al. and U.S. Pat. No. 6,945,585, to Liu et al.

SUMMARY OF THE PRESENT INVENTION

The present invention discloses a height compensating latch supported upon an underside of a rotatable vehicle seat and including a pair of spaced apart support plates, between which are pivotally supported a hook rotatable between a floor supported striker engaging position and a further position permitting rotation of the seat. A cam is also supported between the plates and triggers actuation of the hook.

A pair of pliant and resilient portions are supported within mounting apertures associated with the plate, an open interior of each resilient portion receiving a mounting fastener for securing the plate to the seat and providing a degree of height compensation between the latch and striker. The pliant and resilient portions include a pair of rubberized bushings sandwiched between the support plates, each of the bushings further including an integrally formed grommet supported within first and second aligning pairs of mounting apertures associated with the plates.

The hook further includes a lower projecting location defining a recessed configuration extending within aligning and recessed undersides of the plate and adapted for engaging the vehicle striker in the first position. The cam is pivotally mounted to the plates such that an upper projecting end abuts, in the first position, a configured surface associated with the hook.

Yet additional features include a first arcuate channel defined in a selected plate, within which a pin extending from an upper location of the cam seats. In this fashion, the pin is located a spaced distance from a pivotal support of the cam and the channel defines a maximum range of actuation of the cam in an unseating direction away from the contact surface with the hook.

A coil spring is provided on an exterior face of the first plate and includes a first end which engages a pin extending from the hook a distance from its pivotal support and projecting through a second arcuate channel defined in the plate. A second end of the spring engages the pin extending from the cam and through the first arcuate channel.

Yet additional features include a cable including an outer sheath extending from a remote location, the sheath securing to a fixed location of the plate and exhibiting a central gap through which projects a linearly displaceable inner cable portion, and end of which is secured upon a cap in turn supported upon the pin extending from the cam. Upon displacement, the pin overcomes a reverse force exerted by the coil spring in order to disengage the hook from the striker.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With reference to the succeeding illustrations, the present invention discloses a floor latch construction which is configured to compensate for height variations established between an underside of a rotating vehicle seat bottom and an associated and floor supported striker. As will be described in additional detail, the floor latch assembly can be supported at either or both of rear/side edge locations of a forwardly pivoting vehicle seat bottom and which compensates for such variations when engaging the seat to the striker in an upright design position.

Figure 1:
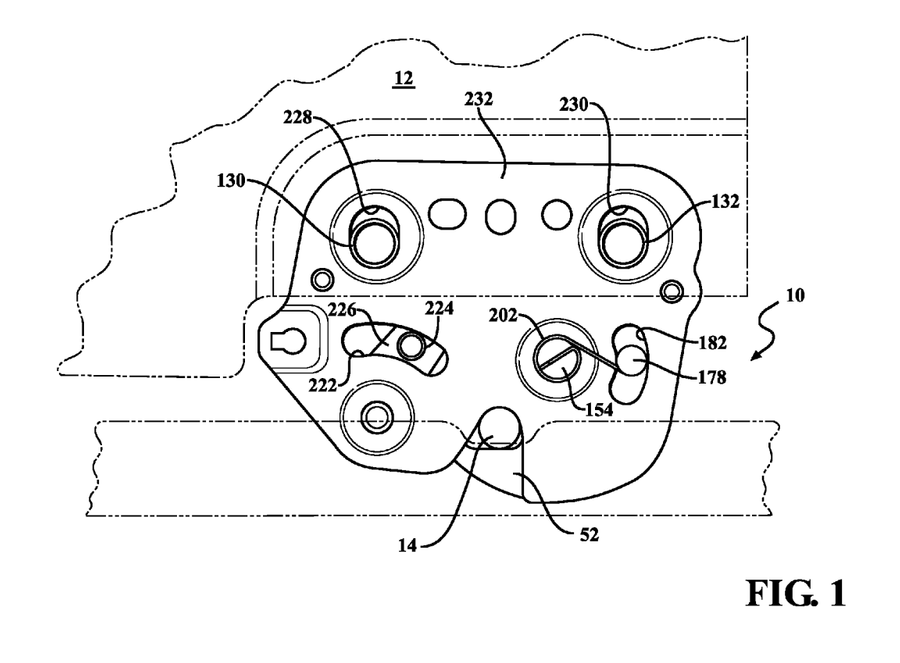
FIG. 1 is a side plan environmental view depicting a height compensating floor latch associated with a mounting location of a pivoting seat bottom frame and in engagement with a vehicle floor supported striker.

Referring to FIG. 1, a side plan environmental view depicts a height compensating floor latch assembly, generally at 10, according to one non-limiting configuration and which is secured to an underside arrayed location of a pivoting seat bottom frame (also termed riser) 12 for engagement with a vehicle floor supported striker (depicted in locational cutaway 14). As will we be best described in reference to the succeeding illustrations, it is understood that the representative assembly depicted in FIG. 1 is subject to minor modifications in the configuration of certain features such as the outer support plates and the dimensioning of the inner package defining hook, cam, spring and bushing components (see additional representative exploded views FIGS. 2 and 11 of related variants) and without departing from the scope of the invention. Also, and with the exception of a durometer rated construction of the bushing mounted grommets hereinafter described, the construction of the latch assembly is understood to include a suitable grade steel material.

Figure 2:
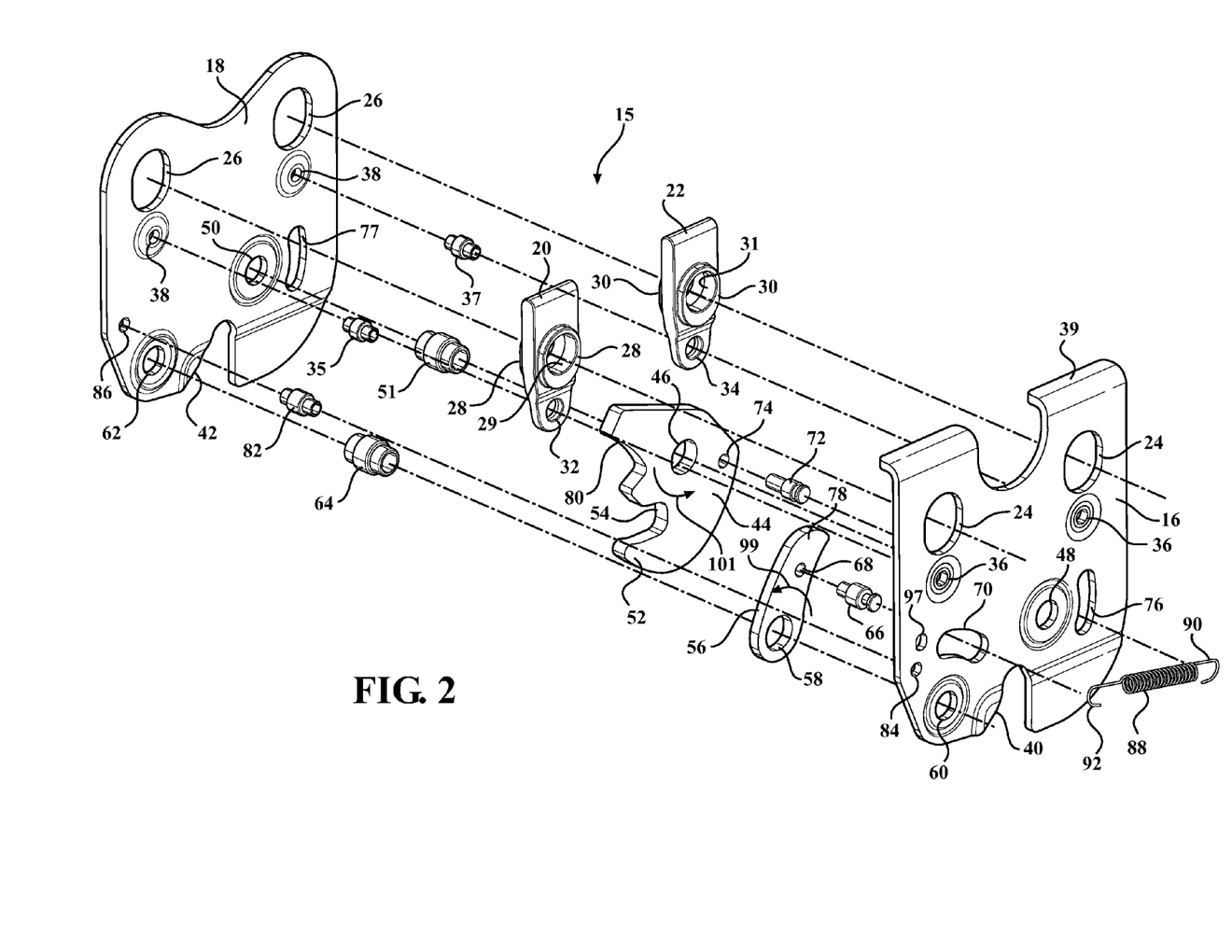
FIG. 2 is an exploded view of the compensating floor latch assembly of FIG. 1.

With reference to the exploded view of FIG. 2, a related latch assembly generally shown at 15 includes a pair of outer left hand 16 and right hand 18 support plates, such as which are secured to the configured and receiving side edge locations of the riser 12 (again referring to the related variant of FIG. 1). A pair of height compensating support bushings 20 and 22 are shown and which sandwich between the plates 16 and 18.

The support plates 16 and 18, along with the other components associated with the latch assembly, are constructed of a suitable grade steel or like material exhibiting the necessary properties and each further exhibits a pair of proximate upper edge located, slightly elongated and vertically extending spaced apart pairs of mounting apertures, see at 24 for plate 16 and further at 26 for plate 18. The pairs of apertures 24 and 26 align upon assembly of the plates 16 and 18 and such that they seat therebetween the compensating bushings 20 and 22, within which are incorporated opposite projecting annular surfaces associated with each of first and second extending end grommets, see at 28 and 30, which form a part of the bushings 20 and 22 and which are sized to be supported within the spaced defined by the aligning support plate apertures 24 and 26 so that each grommet 28 and 30 is seated against the inner perimeter extending surface defined by each aligning pair of selected apertures 24 and 26 of the pairs of apertures. The bushings with integrally fanned grommet portions are further understood as constructed of any structurally supporting and combination pliant and resilient material, such as notably a heavy duty durometer rated rubber and which, in use, will provide a measured degree of flex or give.

Additional apertures 32 and 34 corresponding to bottom locations of the support bushings 20 and 22 further align with corresponding pairs of apertures 36 and 38 associated with the support plates 16 and 18 prior to installing rivets 35 and 37. Upon assembly of the plates 16 and 18 and intermediate positioned bushings 20 and 22 between and within the aligning apertures 24 and 26 of the plates 16 and 18, a pair of mounting fasteners (not shown) associated with the mounting location of the seat frame riser 12, are inserted through the open interior defined through the grommets 28 and 30 (see inner perimeter walls 29 and 31) and the surrounding plates 16 and 18 (with further engaging end nuts or rivets mounted to end locations of the fasteners which project beyond the apertures 24 externally of the support plate 16) in order to secure the package assembly to the underside frame riser and to concurrently provide for a degree of misalignment support for permitting such as up/down movement of the latch assembly 10 relative to its engagement to the seat riser 12 (see again FIG. 1).

Figure 6:
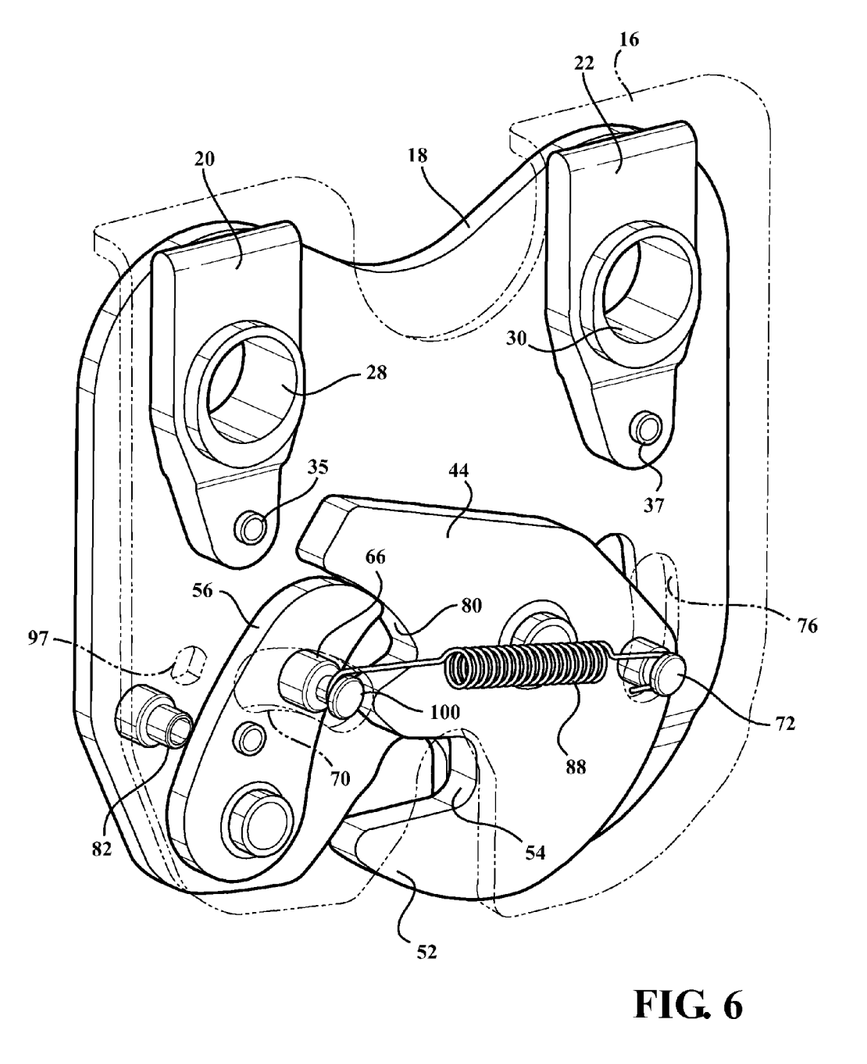
FIG. 6 is an assembled perspective of the latch assembly with selected outer support plate depicted in phantom similar to FIG. 3 and again illustrating the features of the pivotally mounted cam and hook along with the mounting of the compensating bushing assemblies.
Figure 6A:
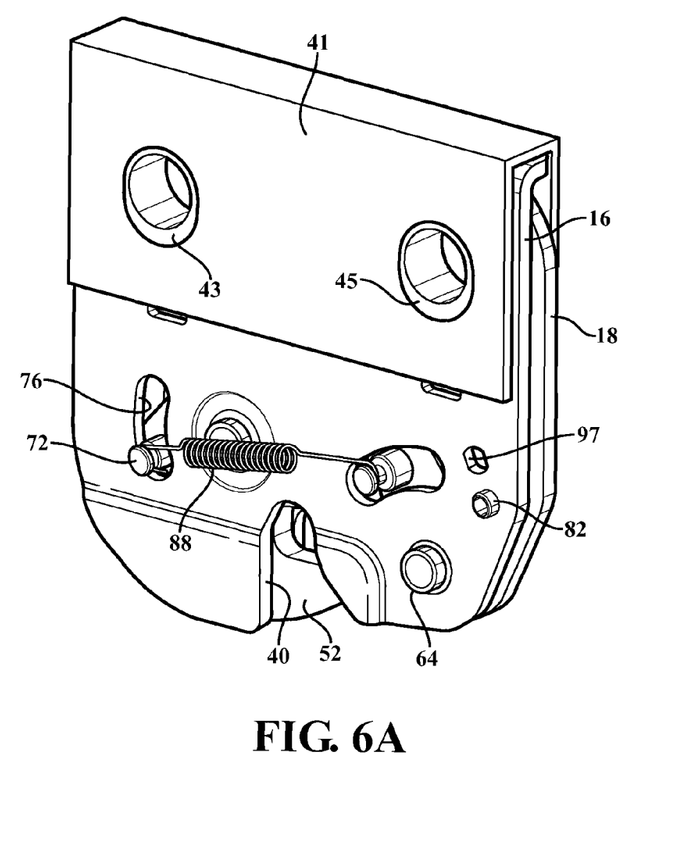
FIGS. 6A and 6B are first and second rotated assembled perspectives of an opposite side mounted latch assembly similar to that depicted in FIG. 6 and which is a substantial mirror of the arrangement in FIG. 2, with both outer support plates shown in solid.
Figure 6B:
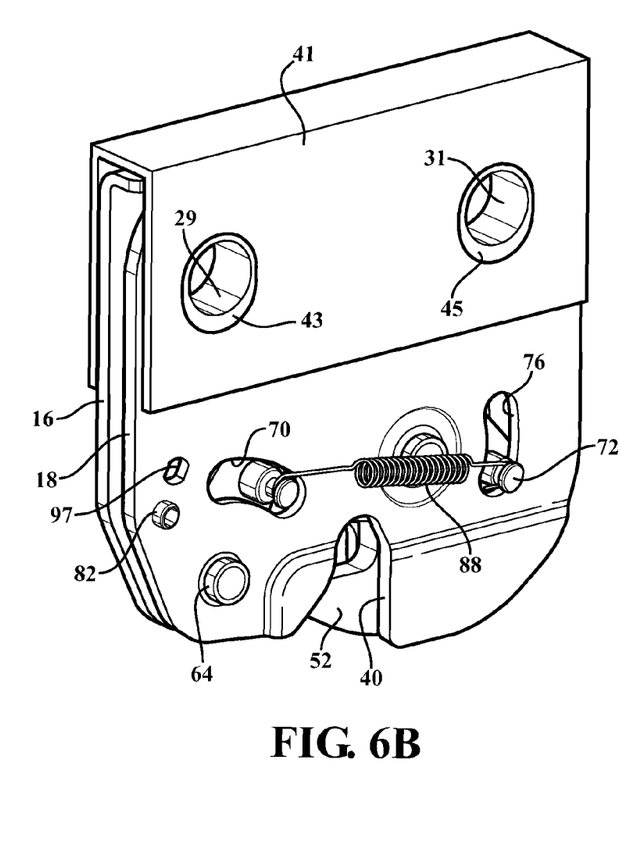

As is further shown, a top edge of the outer plate 16 exhibits an inner curve 39 and, as further referenced in succeeding views, a "U" shaped outer support plate, see at 41 is also provided as best shown in FIGS. 6A and 6B and which further include aligning pairs of apertures 43 and 45 established through the spaced apart side walls of the support plate 41. As depicted, the apertures 43 and 45 in the outer support plate 41 align with the bushing supported grommets 28 and 30 upon mounting the "U" shaped support over the upper portions of the inner package space defining support plates 16 and 18 and in order to provide additional structural support when mounted to the seat riser 12.

The support plates 16 and 18, as shown, exhibit a generally heightened or taller configuration than associated with other similar latch assemblies and which, in combination with the compensating bushings 20 and 22, permit for such variations in seat riser 12 design as depicted in FIG. 1, in relation to the location and arrangement of the floor mounted striker 14. The configuration of the aligning undersides of the plates 16 and 18 each further exhibit an arcuate recess profile, see at 40 for plate 16 and at 42 for plate 18.

A rotating hook 44 is provided with an interior aperture 46 which is aligned between apertures 48 and 50 in the plates 16 and 18 and in order to rotatably secure the hook 46, via rivet 51 in non-interfering fashion with compensating bushings 20 and 22. The hook 46 includes a lower projecting location 52 defining a recessed inside configuration 54 adapted for engaging the vehicle striker 14 as shown in FIG. 1 when the hook 46 is in a pre-actuated position.

A cam 56 is provided at a proximate and forward location relative to the hook 44 and includes an aperture 58 which aligns with apertures 60 and 62 in the plates 16 and 18 prior to installation of a rivet 64 for rotatably mounting the cam 56. A pin 66 secures to an upper intermediate location of the cam 56 via an aperture 68 and so that the pin 66 extends within a generally arcuate channel 70 defined in the plate 16 and to thereby limit an overall pivotal range of the cam 56.

Similarly, a further pin 72 engages a rear location of the hook 44 evidenced by aperture 74 and in turn extends within a further generally vertical extending and arcuate channel 76 in plate 16 and aligning channel 77 in plate 18 for likewise limiting a range of pivot of the hook 56. An upper projecting end 78 of the cam 56 abuts, in a design position, against a configured abutment surface 80 associated with the hook 44 which is located above the striker engaging location 54 and on an opposite pivotally inducing location relative to the pivot point 46. A fixed pin 82 extends between apertures 84 and 86 located proximate forward edges of the plates 16 and 18 and, in combination with the channel 70 within which the pin 66 seats, defines a maximum range of actuation of the cam 56 in an unseating direction away from the contact surface 80 with the hook 44.

A coil spring 88 is provided on an exterior face of the plate 16 and includes a first curled end 90 which engages the pin 72 projecting through the channel 76. A second curled end 92 engages the pin 66 extending through the channel 70.

Figure 6C:
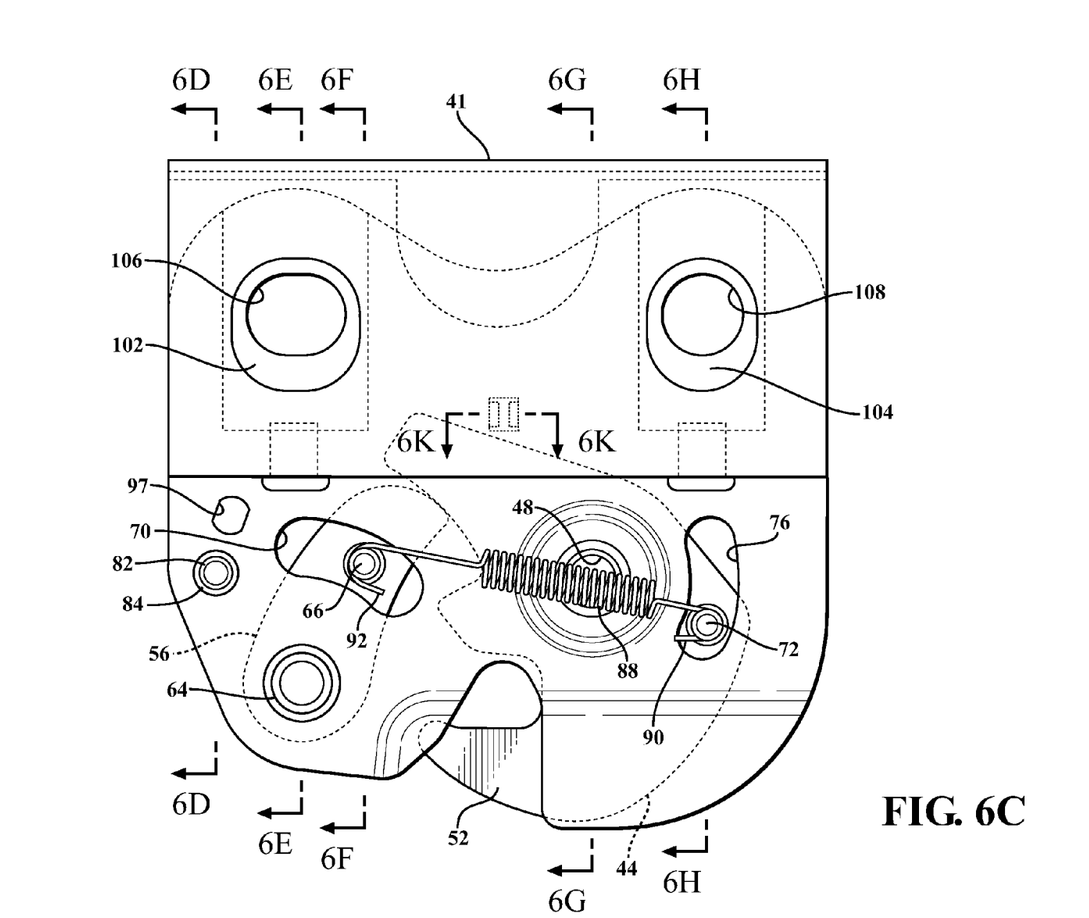
FIG. 6C is a side plan view of the latch assembly with inner cam, hook and bushing components depicted in phantom.
Figure 6D:
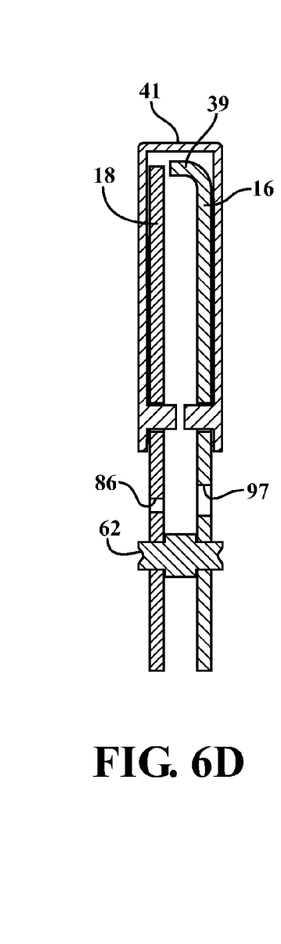
FIG. 6D is a first cutaway view taken along line 6D-6D in FIG. 6C and which additionally shows the "U" shaped outer support plate secured about upper portions of the package spaced defining support plates in order to provide additional structural support when mounted to the seat riser.
Figure 6E:
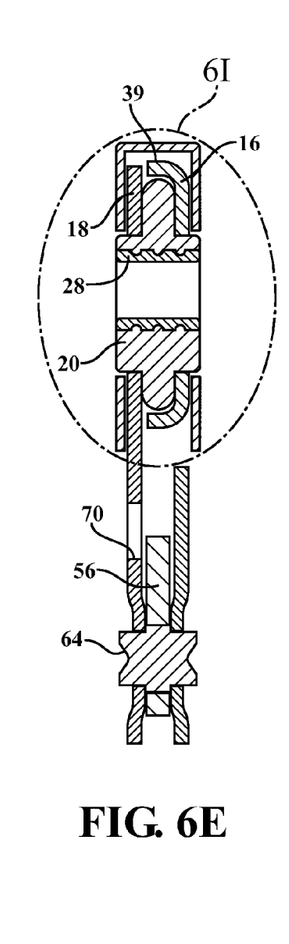
FIG. 6E is a second cutaway view taken along line 6E-6E of FIG. 6C and showing in cross sectional depiction the cam and selected bushing assembly.
Figure 6F:
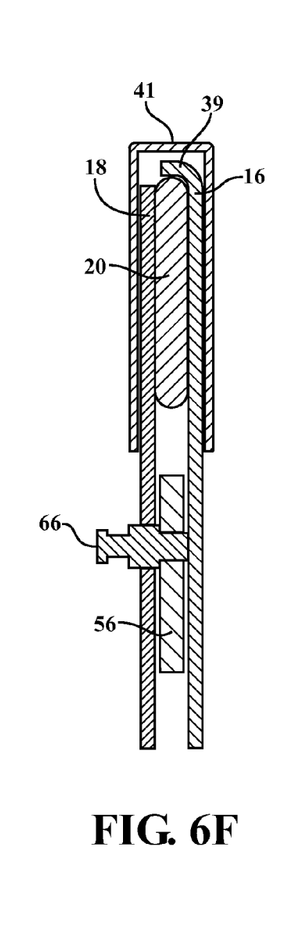
FIG. 6F is a third cutaway view taken along line 6F-6F in FIG. 6C and depicting a further successive spaced location across the vertical height of the assembly package and which depicts the cam and associated pin which is capable of arcuate pivotal travel within the support plate interior configured channel.
Figure 6G:
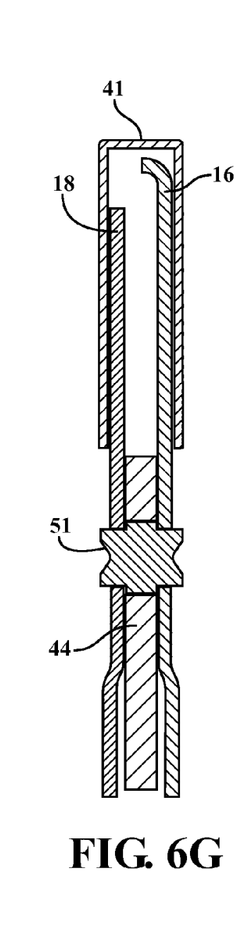
FIG. 6G is a fourth cutaway view taken along line 6G-6G in FIG. 6C and illustrating the hook pivot point location.
Figure 6H:
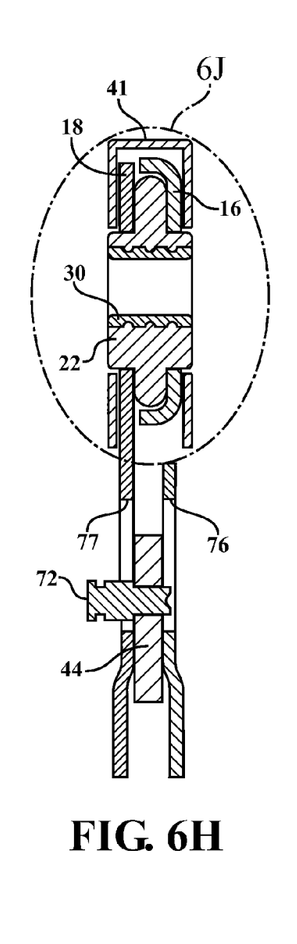
FIG. 6H is a fifth cutaway view taken along line 6H-6H of FIG. 6C and illustrating a further collection of cross sectional features including a further bushing assembly (similar to that shown in FIG. 6E) as well as the hook, pin and further associated arcuate travel channel in the support plate (as compared to that associated with the arcuate travel range of the cam mounted Pin)
Figure 6I:
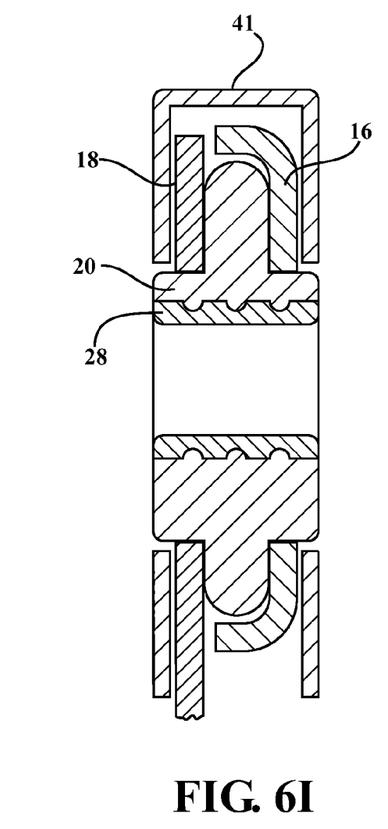
FIGS. 6I and 6J are enlarged upper partial views taken from the cross sectional cutaways of FIGS. 6E and 6H, respectively, and better illustrating the construction of the bushing assemblies.
Figure 6J:
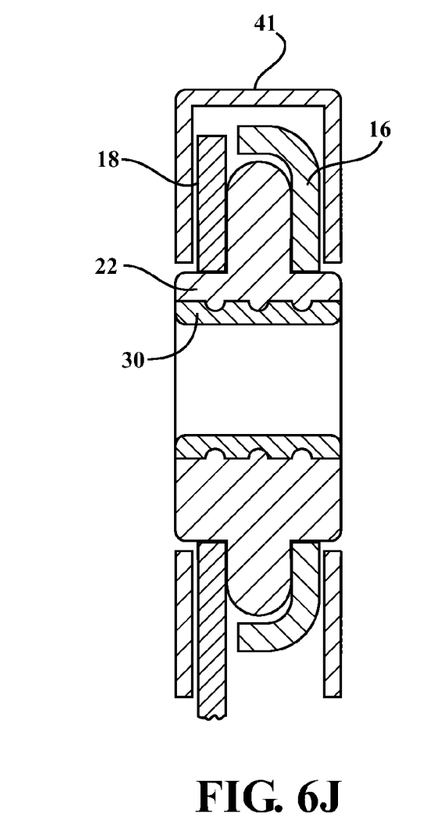
Figure 6K:
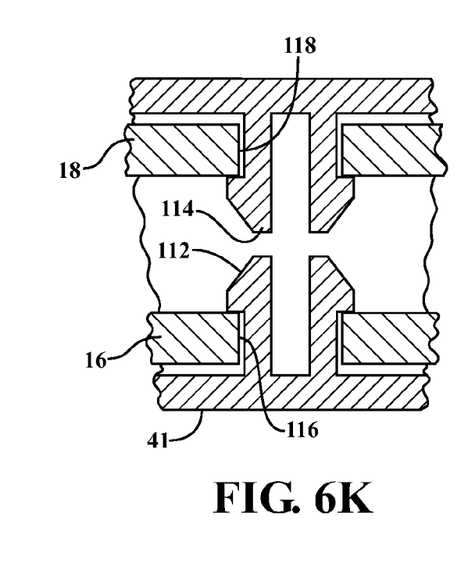
FIG. 6K is a sixth cutaway view taken along line 6K-6K of FIG. 6C and showing the positioning and construction of an abutment location defined in the package interior for limiting, along with the hook pin end stop location within the support plate channel, upward pivoting motion of the hook.
Figure 6L:
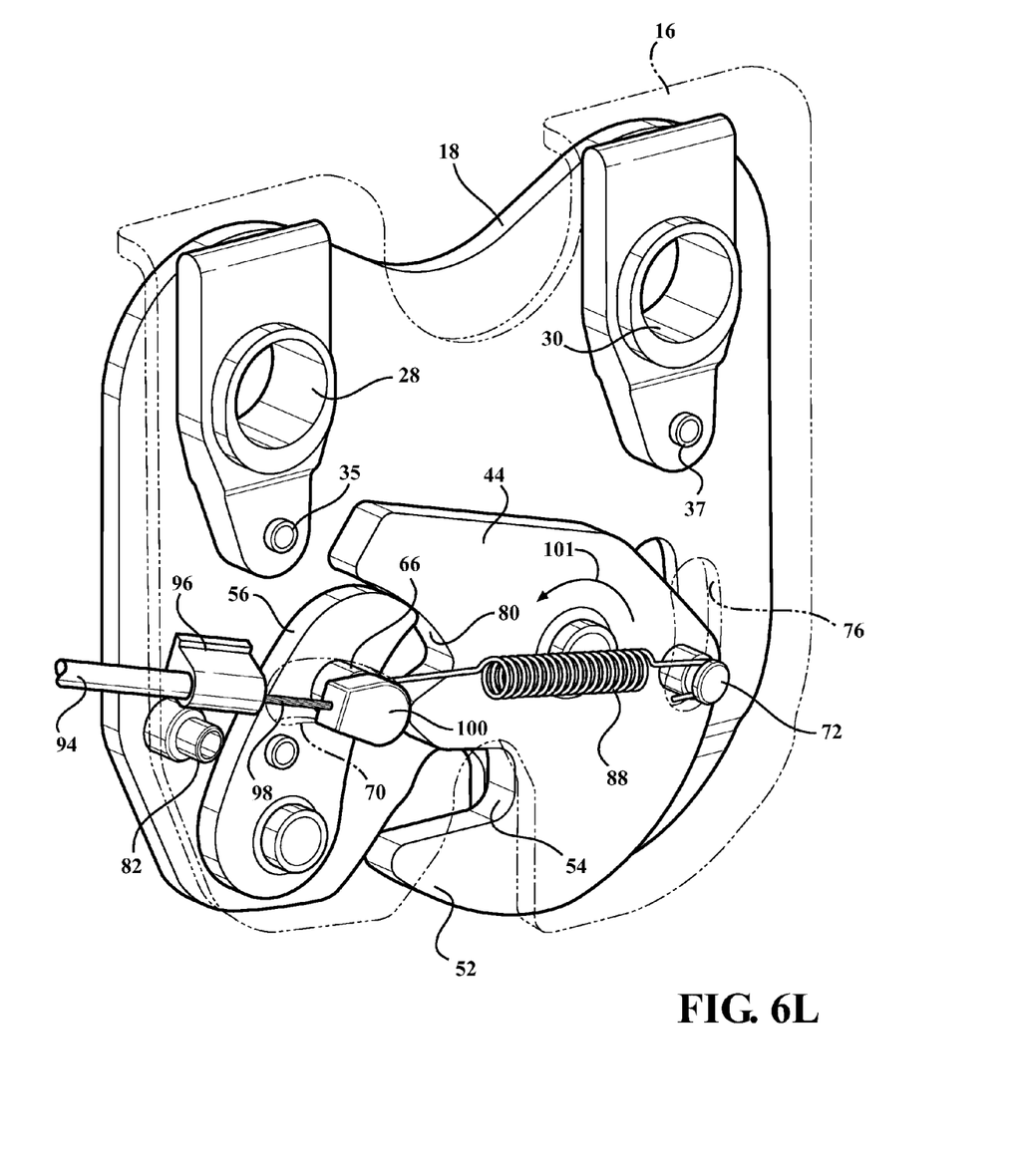
FIG. 6L is an illustration similar to FIG. 6 and further showing the mounting arrangement of the cable for with outer sheath and inner displaceable portion for trigger pivotal actuation of the cam and subsequent rotation of the hook.

As further shown in FIG. 6L a cable includes an outer sheath 94 extending from a remote location (not shown but understood to include a lever or handle positioned at some interior location of the vehicle). The cable sheath 94 secures to a fixed location 96 supported upon a further aperture 97 (see FIG. 2) defined in plate 16 just above the pin 82 and aligning hole 84. The cable sheath 94 exhibits a central gap through which projects a linearly displaceable 98 inner cable portion, and end of which is anchored to a cap 100, the underside of which is configured to engaged over the enlarged end of the pin 66, and to which the coil spring 88 through its attachable end 92 for exerting a combined pulling and pivoting force against the hook 44 and a direction depicted by arrow 101.

In use, and upon said cable exerting a force on said pin 66 which overcomes the restraining/engaging force of the coil spring 88, the cam 56 is forcibly pivoted in a counterclockwise direction, see arrow 99 in FIG. 2, such that the second end 92 of the spring 88 is communicated along arcuate channel 70 via pin 66, concurrent with first end 88 communicated along arcuate channel 76 via pin 72. In this fashion, and upon the linear center line of the spring 88 rising above the pivot 46 location of the hook 44 (this resulting from travel along arcuate channels 70 and 76) an over center condition is created which influences the hook to likewise pivot in a counter clockwise and striker unseating direction (again at 101 in each of FIGS. 2 and 6L).

Figure 3:
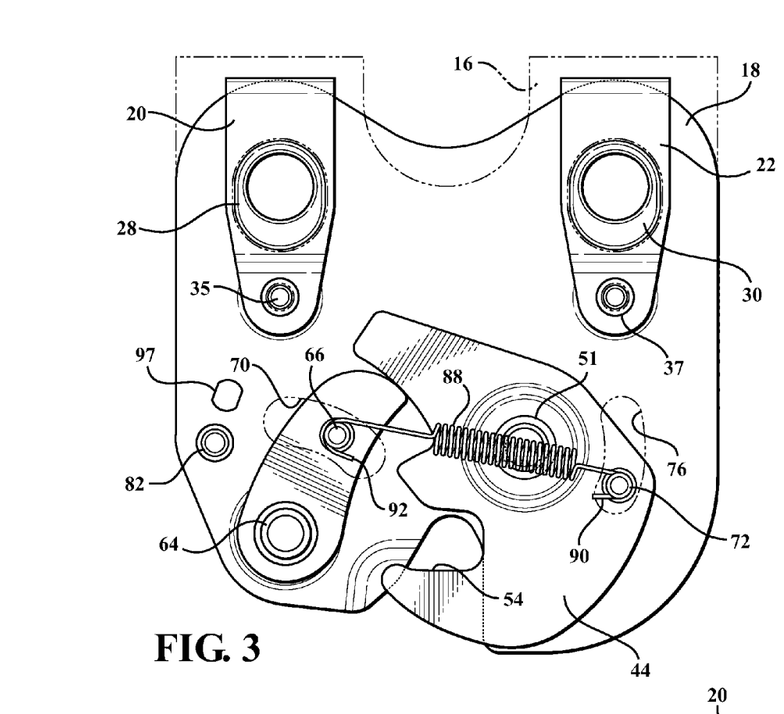
FIG. 3 is a plan view of the latch assembly with a selected support plate illustrated in phantom and better illustrating the pivoting mounting configuration of the cam and hook.
Figure 4:
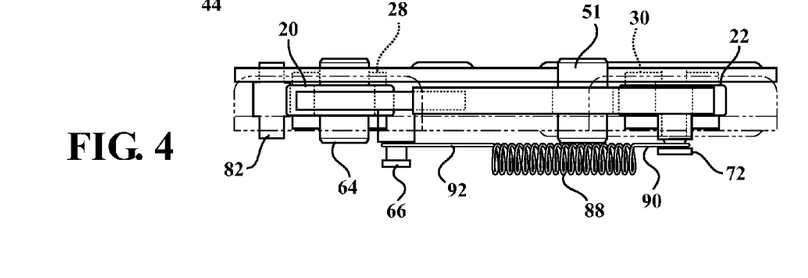
FIG. 4 is a rotated top view of the latch depicted in FIG. 3.
Figure 5:
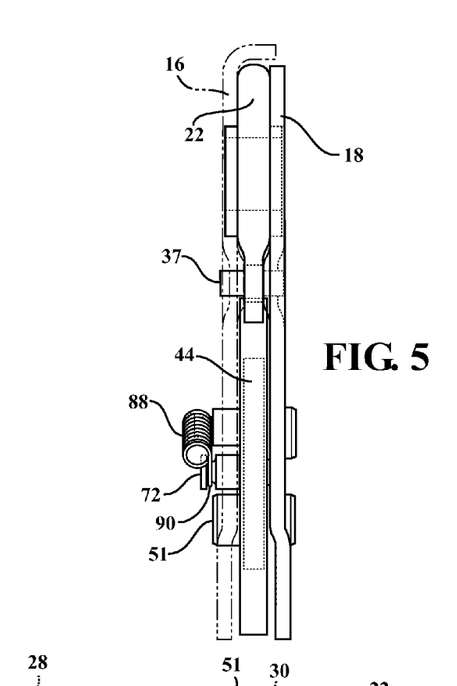
FIG. 5 is a further rotated end view of the latch also depicted in FIG. 3.

In view of the description of latch operation, FIGS. 3-5 exhibit plan, top rotated, and side rotated line art views of the latch assembly and which better illustrates the limited range of vertical adjustability associated with the interface between the rubberized grommet portions 28 and 30 of the compensating bushings 20 and 22 and which are seated within the pairs of mounting apertures 24 and 26 in the support plates 16 and 18 and the compensating bushings 20 and 22. FIGS. 6a-6k further illustrate a progression of perspective, plan and individual cutaway views of the floor latch.

Among these, FIGS. 6A and 6B illustrate, respectively, right and left side assemblies mounted to corresponding sides of the seat bottom riser (the left hand version of FIG. 6b being depicted in FIG. 1 and with FIGS. 6A and 6B generally defining a mirror arrangement to that shown in the exploded view of FIG. 2) such that identical reference numerals are used without further elaboration. It is generally understood that a typical pivotal seat will include a pair of spaced apart side edge mounted latch assemblies, while it is also envisioned that a single such assembly can be provided in certain instances.

Figure 7:
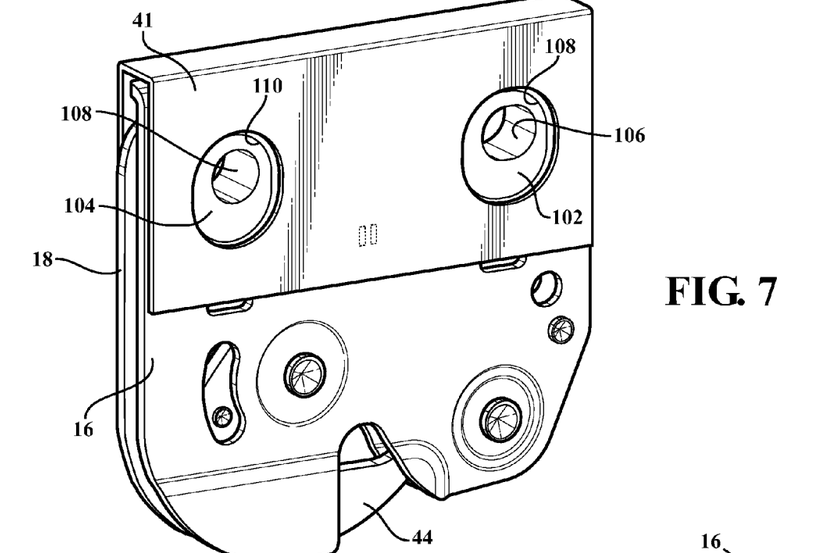
FIG. 7 is a rotated perspective view of a height adjusting latch assembly depicted in FIG. 6C and typically associated with an opposite rear side of the vehicle bottom.
Figure 8:
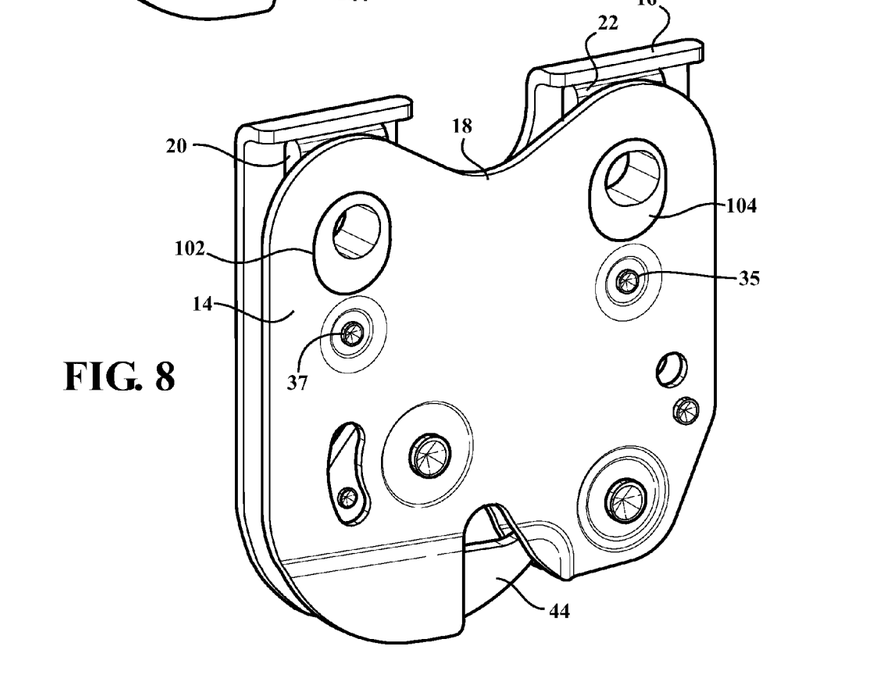
FIG. 8 is a mirror opposite side latch assembly as compared to that shown in FIG. 7 and with the reinforcing outer "U" shaped plate removed.

FIG. 6C is a side plan view of the latch assembly with inner cam, hook and bushing components depicted in phantom. Along with the mirroring (opposite riser side engaging) versions of the latch corresponding to FIGS. 7 and 8, a pair of alternately configured rubberized grommets 102 and 104 are depicted (in substitution of the bushings 20 and 22 with integrated grommets 28 and 30). For purposes of ease of illustration, repetitive features previously described are unlabeled with focus being given to the construction, configuration and installation of the grommets 102 and 104.

The grommet 102 includes a first oblong shaped inner perimeter 106 and a second circular inner perimeter 108 is defined within the grommet 104, the configuration of both perimeters providing structural integrity to the supporting grommets upon installation therethrough of mounting fasteners (again not shown). The rubber grommets 102 and 104 are positioned within the enclosed space accessible through the aligning pairs of apertures 24 and 26 in the spaced apart plates 16 and 18 and which can again be employed to provide additional variance in adjustment in response to variations in striker height.

Upon installation of mounting bolts or the like (again not shown) through the open interior of the sleeve shaped grommets 102 and 104 and into engagement with defined locations in the seat riser. The individual rubberized grommets 104 and 106 can further be mounted within enlarged support plate apertures 108 and 110, these establishing inner defined sleeves and, in use, provide a measure of substantially vertical compensating support. In this fashion, the latch 44 is permitted to compensate a measured degree (owing to the compressible/deflectable nature of the supporting grommets) to maintain hook engagement (or re-engagement) with the striker and to further compensate for either misalignment or height variations established in the latch to striker interface.

Referring now to FIG. 6D, a first cutaway view taken along line 6D-6D in FIG. 6C and which additionally shows the "U" shaped outer support plate 41 secured about upper portions of the package spaced defining support plates 16 and 18 in order to provide additional structural support when mounted to the seat riser. FIG. 6E is a second cutaway view taken along line 6E-6E of FIG. 6C and showing in cross sectional depiction the cam 56 and selected bushing 20 assembly with inner supported grommet 28.

FIG. 6F is a third cutaway view taken along line 6F-6F in FIG. 6C and depicts a further successive spaced location across the vertical height of the assembly package and which depicts the cam 56 and associated pin 66 which is capable of arcuate pivotal travel within the support plate interior configured channel. FIG. 6G is a fourth cutaway view taken along line 6G-6G in FIG. 6C and illustrating the hook 44 and its pivot point location including main pin 51.

FIG. 6H is a fifth cutaway view taken along line 6H-6H of FIG. 6C and illustrating a further collection of cross sectional features including the other bushing assembly 22 (similar to that shown at 20 in FIG. 6E) as well as the hook 44, pin 72 and further associated arcuate travel channels 76 and 77 in the support plates 16 and 18 (as compared to that associated with the arcuate travel range defined by perimeter surface 70 of the cam mounted pin 66. FIGS. 6I and 6J are enlarged upper partial views taken from the cross sectional cutaways of FIGS. 6E and 6H, respectively and better illustrating the construction of the bushing assemblies.

FIG. 6K is a sixth cutaway view taken along line 6K-6K of FIG. 6C and shows the positioning and construction of an abutment defined in the package interior for both mounting the "U" shaped support 41 about the upper portions of the support members 16 and 18 as well as for acting as an end stop for limiting upward pivoting of the hook 44, this along with the hook pin 72 and bottom end stop location defined by the support plate channel 76. A pair of opposing and inner projecting protrusions, at 112 and 114, exhibit inwardly deflecting and engaging tangs and which are defined upon inner sides of the outer "U" shaped support 41 extending into apertures (see perimeter surfaces 116 and 118) further defined at aligning locations with the package defining support plates 16 and 18, such that the engaging protrusions 112 and 114 function both to engaging the outer "U" shaped reinforcing support 41 about the substantially planar and interior package defining plates 16 and 18, as well as to define an upper pivot stop to the rotating hook.

Figure 9:
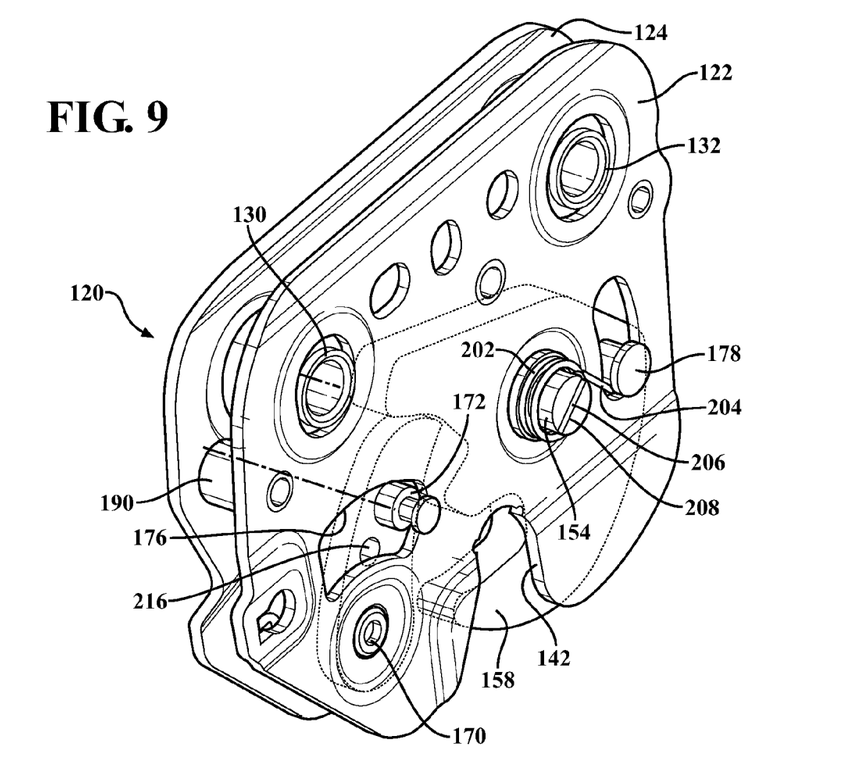
FIG. 9 is a perspective view of a latch assembly according to a further variant similar to that initially illustrated in FIG. 1 and which depicts an alternate configuration of bushings along with depicting in phantom a pivotally mounted cam and hook occupying the interior package defining space stabled between the support plates.
Figure 10:
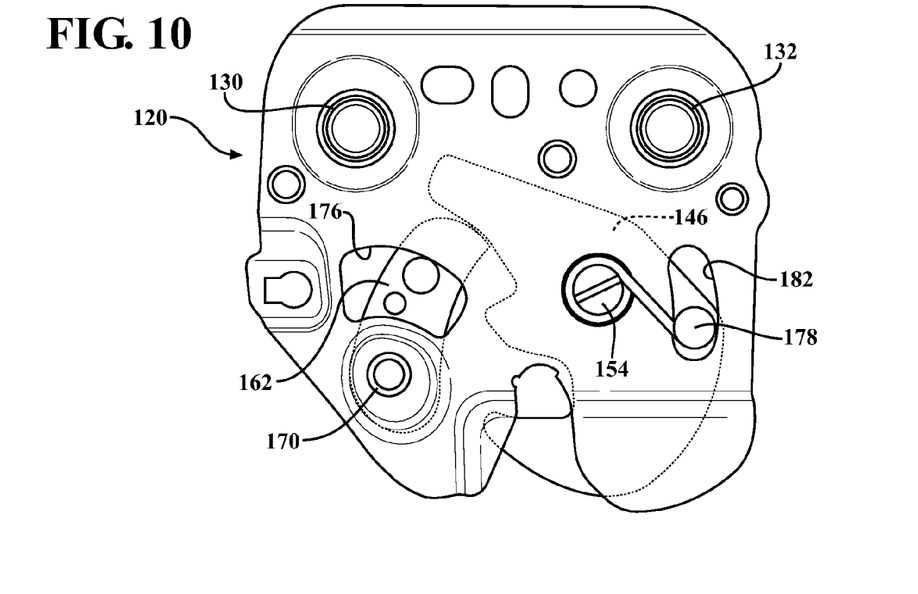
FIG. 10 is a plan view of the latch assembly shown in FIG. 9 and better illustrating the redesigned cam pin and arcuate travel slot defined in the selected support plate, along with an additional cam defined aperture for seating an end of a cam pivot mounted torsional spring for biasing the cam in a normally engaged position with the configured abutment surface associated with the pivotally supported hook.
Figure 11:
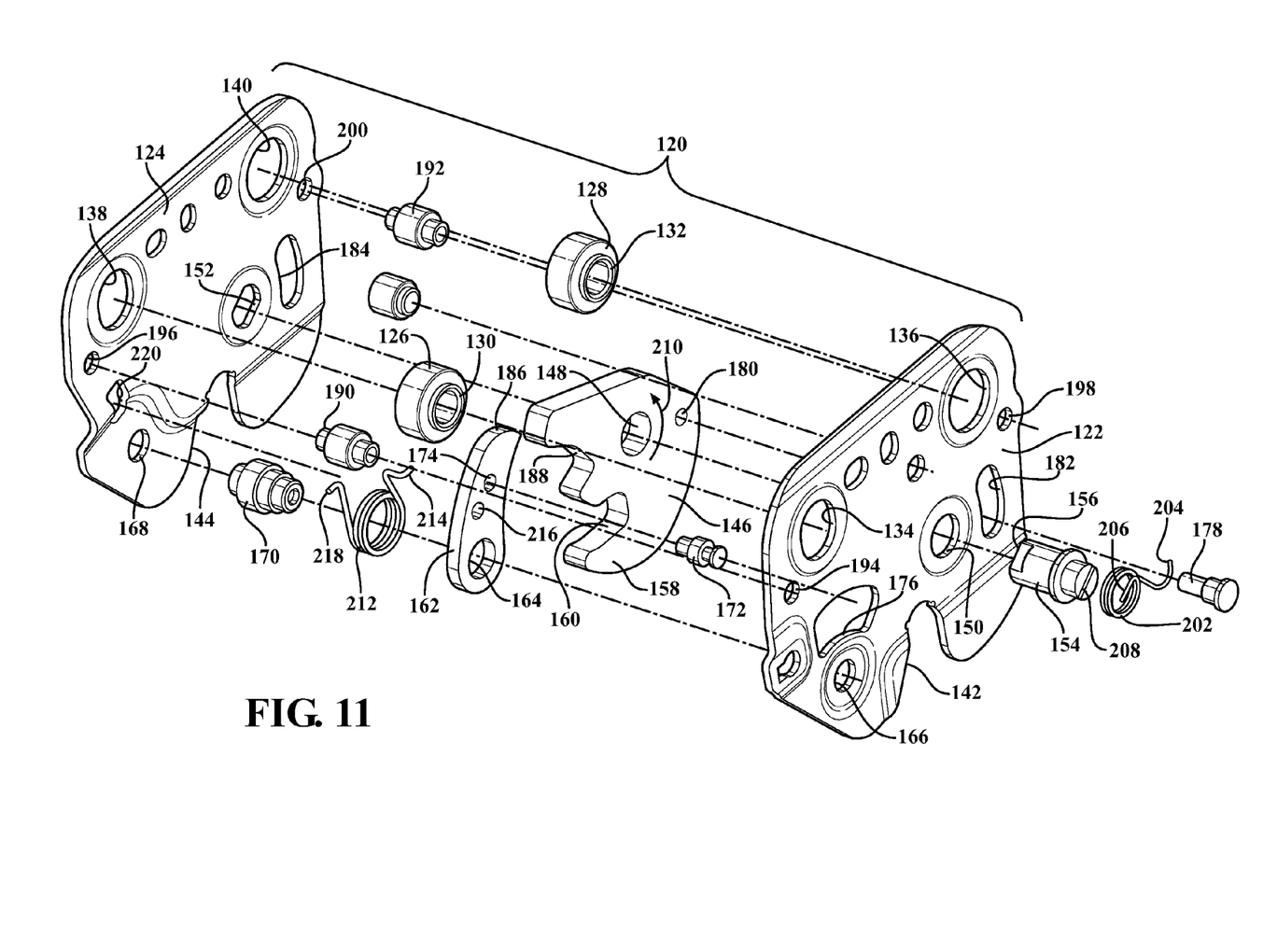
FIG. 11 is an exploded view of the latch assembly of FIG. 9.

Referring now to FIGS. 9-11, a further variant of latch assembly is generally shown at 120 and which is largely identical in construction and operation to that previously depicted such as in FIG. 2 et seq. Features associated with the variant 120 depicted include an alternate configuration of bushings along with depicting in phantom a pivotally mounted cam and hook occupying the interior package defining space stabled between the support plates.

As with the earlier described embodiment, a pair of outer left hand 122 and right hand 124 support plates are provided, such as which are again secured to the configured and receiving side edge locations of the riser 12 (again referring to the related variant of FIG. 1). A pair of height compensating support bushings are depicted at 126 and 128 (as compared to bushings 20 and 22 as shown in FIG. 2 and alternately by grommets 102 and 104 in FIGS. 6C, 7 and 8). As in earlier variants, the bushings 126 and 128 sandwich between the plates 122 and 124 such that inner mounting grommet portions 130 and 132 mounted within the bushings define mounting fastener receiving interior perimeter surfaces.

A first pair of mounting apertures 134 and 136 are defined proximate an upper edge of the first support plate 122, with a mating second pair of apertures 138 and 140 likewise being located in aligning fashion within the second support plate 124. As shown, aligning apertures 134 and 138 exhibit a slightly vertical oblong profile, whereas the other pair of aligning apertures 136 and 140 exhibit matching circular profiles and such that they seat therebetween the compensating bushings 126 and 128 in a manner which can facilitate multi-dimensional adjustment of the projecting grommets 130 and 132 relative to the oblong 134/138 and circular 136/140 perimeter defining surfaces of the pairs of support plate apertures, this again facilitating a range of adjustability of the latch assembly 120 relative to the seat riser 12 to facilitate engagement with a floor mounted striker.

The bushings with integrally formed grommet portions are again understood to be constructed of any structurally supporting and combination pliant and resilient material, such as notably a heavy duty durometer rated rubber and which, in use, will provide a measured degree of flex or give. As with the previously described variants, and upon assembly of the plates 122 and 124 and intermediate positioned bushings 126 and 128 between and within the pairs of oblong 134/138 and circular 136 and 140 aligning apertures, a pair of mounting fasteners (not shown) associated with the mounting location of the seat frame riser 12, are inserted through the open interior defined through the grommets 130 and 132 and the surrounding plates 122 and 124 (with further engaging end nuts or rivets again mounted to end locations of the fasteners which project beyond the apertures externally of the outer support plate 122 in order to secure the package assembly to the underside frame riser and to concurrently provide for a degree of misalignment support for permitting such as up/down movement of the latch assembly 120 relative to its engagement to the seat riser 12 (see again FIG. 1).

The support plates 122 and 124, similar as shown in previous embodiments, exhibit a generally heightened or taller configuration than associated with other similar latch assemblies and which, in combination with the compensating bushings 126 and 128, permit for such variations in seat riser 12 design as depicted in FIG. 1, in relation to the location and arrangement of the floor mounted striker 14. The configuration of the aligning undersides of the plates 122 and 124 each further exhibit an arcuate recess profile, see at 142 for plate 122 and at 144 for plate 124.

A rotating hook 146 is provided with an interior aperture 148 which is aligned between apertures 150 and 152 in the plates 122 and 124 and in order to rotatably secure the hook 146, via rivet 154 including a keyed end and which inserts from an exterior side of the outer support plate 122 in non-interfering fashion with compensating bushings 126 and 128 and so that the keyed end profile 156 of the hook rivet 154 seats within a mating keyed profile associated with aperture 152 in the other plate 124. As with the previous embodiment, the hook 146 includes a lower projecting location 158 defining a recessed inside configuration 160 adapted for engaging the vehicle striker 14 as shown in FIG. 1 when the hook 146 is in a pre-actuated position.

A cam 162 is provided at a proximate and forward location relative to the hook 146 and includes an aperture 164 which aligns with apertures 166 and 168 in the plates 122 and 124 prior to installation of a rivet 170 for rotatably mounting the cam 162. A pin 172 secures to an upper intermediate location of the cam 162 via an aperture 174 and so that the pin 172 extends within a generally arcuate channel 176 defined in the plate 122 and to thereby limit an overall pivotal range of the cam 162.

Similarly, a further pin 178 engages a rear location of the hook 146 evidenced by aperture 180 and in turn extends within a further generally vertical extending and arcuate channel 182 in plate 122 and aligning channel 184 in plate 124 for likewise limiting a range of pivot of the hook 146. An upper projecting end 186 of the cam 162 abuts, in a design position, against a configured abutment surface 188 associated with the hook 146 which is located above the striker engaging location 160 and on an opposite pivotally inducing location relative to the pivot point 148. A pair of spacer rivets 190 and 192 seat between aligning apertures 194/196 and 198/200 at locations established within the support plates 122 and 124 in order to assist in establishing the desired package space dimensions for the pivoting hook 146 and cam 162.

A first torsion spring 202 is provided on an exterior face of the plate 122 and includes an extending end 90 which engages the pin 178 projecting through the channel 182. An inner end 206 engages a notch recess 208 extending through a head of the hook pivot rivet 154 in order to bias the hook in a counterclockwise direction as evidenced by arrow 210.

A second torsion spring 212 seats around rivet 170 and includes a first end 214 which engages an aperture 216 in the cam 162 spaced from the pin seating aperture 174, a second end 218 engaging an aperture location 220 of the support plate 124 in order to bias the cam 162 in a direction towards the support surface 188 of the hook 146.

FIG. 10 is a plan view of the latch assembly shown in FIG. 9 and better illustrating the redesigned cam pin 172 and arcuate travel slot 176 defined in the selected support plate 122 (such being enlarged to provide clearance for the engaging torsion spring end 214 influencing the cam 162. The original variant of FIG. 1 is similar in depiction to that shown in FIGS. 9-11, with the exception that additional arcuately configured slots, see for example at 222, are defined in either or both of the support plates in order to seat a pin 224 extending from a cam 226. The variant of FIG. 1 otherwise depicts a range of vertical and/or horizontal adjustability typical of all the disclosed embodiments (see gaps defined between grommets 130 and 132 inner perimeter apertures 228 and 230 of selected plate 232) for securing the latch assembly relative to the mounting fasteners associated with the seat riser 12 extending through the grommet interiors.

Having described our invention, other and additional preferred embodiments will become apparent to those skilled in the art to which it pertains, and without deviating from the scope of the appended claims.

I claim:

1. A height compensating latch assembly supported upon an underside of a rotatable supported vehicle seat, comprising:
   first and second support plates between which are mounted a hook rotatable between a first position engaging a floor supported striker and a second position permitting rotation of the seat, a cam pivotally mounted between said support plates and triggering actuation of said hook; and
   a pair of bushings supported between said plates in communication with aligning pairs of mounting apertures associated with said plates, an open interior of each bushing receiving a mounting fastener extending from a frame location of the seat for securing said plates to the seat and for providing a degree of at least height adjustability between said latch assembly and the floor mounted striker.

2. The invention as described in claim 1, said bushings further comprising an integrally formed grommet supported within first and second aligning pairs of mounting apertures associated with said plates.

3. The invention as described in claim 1, said aligning pairs of mounting apertures associated with said plates further comprising varying horizontal length dimensions.

4. The invention as described in claim 1, further comprising a hook influencing pin extending from a location of said hook spaced from a pivotally supported location, said pin seating through an arcuate and height extending aperture defined in at least one of first and second spaced apart support plates and defining a pivotal range of said hook.

5. The invention as described in claim 4, further comprising a first torsion spring seating over a head of a stationary pin about which said hook pivots, an end of said spring engaging said hook influencing pin toward a top perimeter edge location of said height extending aperture.

6. The invention as described in claim 1, said hook further comprising a lower projecting location defining a recessed configuration extending within aligning and recessed undersides of said plate and adapted for engaging the vehicle striker in the first position.

7. The invention as described in claim 6, further comprising said cam being pivotally mounted to said plates such that an upper projecting end abuts, in said first position, a configured surface associated with said hook.

8. The invention as described in claim 7, further comprising a first arcuate channel defined in a selected plate, within which a pin extending from an upper location of said cam seats, said pin being a spaced distance from a pivotal support of said cam and said channel defining a maximum range of actuation of said cam in an unseating direction away from said contact surface with said hook.

9. The invention as described in claim 8, further comprising a coil spring provided on an exterior face of said first plate and including a first end which engages a pin extending from said hook a distance from its pivotal support and projecting through a second arcuate channel defined in said plate, a second end of said spring engaging said pin extending from said cam and through said first arcuate channel.

10. The invention as described in claim 9, further comprising a cable including an outer sheath extending from a remote location, said sheath securing to a fixed location of said plate and exhibiting a central gap through which projects a linearly displaceable inner cable portion, and end of which is secured upon a cap in turn supported upon said pin extending from said cam and such that, upon displacement, overcoming a reverse force exerted by said coil spring to disengage said hook from said striker.

11. The invention as described in claim 8, further comprising a second torsion spring seating around a support pin associated with cam, a first end of which engaging said cam offset from its pivot location and a second end engaging a support plate for biasing said cam against said hook.

12. The invention as described in claim 11, further comprising a cable including an outer sheath extending from a remote location, said sheath securing to a fixed location of said plate and exhibiting a central gap through which projects a linearly displaceable inner cable portion, and end of which is secured upon a cap in turn supported upon said pin extending from said cam and such that, upon displacement, overcoming a reverse force exerted by said torsion spring to disengage said hook from said striker.

13. A height compensating latch assembly supported upon an underside of a rotatable supported vehicle seat, comprising:
   a pair of support plates, each including a substantially planar inner face and which are separated by a plurality of spacer rivets in order to define an inner package space containing a pivotally mounted hook movable between a first position engaging a floor supported striker and a second position permitting rotation of the seat;
   a cam pivotally mounted at a further location between said support plates and being normally biased in a first direction to abut a surface location of said hook in said floor supported striker position, as well as actuated in a reverse direction for triggering actuation of said hook to said second position; and a pair of bushing assemblies including a pair of opposite projecting grommets which extend into enlarged mounting apertures associated with said plates such that an annular space is defined between an exterior perimeter surface of each grommet and an inner perimeter surface of each mounting aperture, an open interior of each grommet receiving a mounting fastener extending from a frame location of the seat for securing said plates to the seat and for providing a degree of at least one of vertical and lateral adjustability between said latch assembly and the floor mounted striker.

14. The invention as described in claim 13, said aligning mounting apertures further comprising a first pair of aligned circular mounting apertures defined in said plates and a second pair of aligned oblong apertures.

15. The invention as described in claim 13, further comprising a second torsion spring seating around a support pin associated with said cam, a first end of which engaging said cam offset from its pivot location and a second end engaging a support plate for biasing said cam against said hook.

16. The invention as described in claim 13, further comprising a first arcuate channel defined in a selected plate and seating therein a pin extending from an upper location of said cam, said pin being a spaced distance from a pivotal support of said cam and said channel defining a maximum range of actuation of said cam in an unseating direction away from said contact surface with said hook.

17. The invention as described in claim 16, further comprising a cable including an outer sheath extending from a remote location, said sheath securing to a fixed location of said plate and exhibiting a central gap through which projects a linearly displaceable inner cable portion, and end of which is secured upon a cap in turn supported upon said pin extending from said cam and such that, upon displacement, overcoming a reverse force exerted by said torsion spring to disengage said hook from said striker.

18. The invention as described in claim 13, further comprising a hook influencing pin extending from a location of said hook spaced from a pivotally supported location, said pin seating through an arcuate and height extending aperture defined in at least one of first and second spaced apart support plates and defining a pivotal range of said hook.

19. The invention as described in claim 18, further comprising a first torsion spring seating over a head of a stationary pin about which said hook pivots, an end of said spring engaging said hook influencing pin toward a top perimeter edge location of said height extending aperture.

20. A height compensating latch assembly supported upon an underside of a rotatable supported vehicle seat, comprising:

a pair of support plates, each including a substantially planar inner face and which are separated by a plurality of spacer rivets in order to define an inner package space containing a pivotally mounted hook movable between a first position engaging a floor supported striker and a second position permitting rotation of the seat;

a cam pivotally mounted at a further location between said support plates and being normally biased in a first direction to abut a surface location of said hook in said floor supported striker position, as well as actuated in a reverse direction for triggering actuation of said hook to said second position;

a first arcuate channel defined in a selected plate and seating therein a pin extending from an upper location of said cam, said pin being a spaced distance from a pivotal support of said cam and said channel defining a maximum range of actuation of said cam in an unseating direction away from said contact surface with said hook;

a hook influencing pin extending from a location of said hook spaced from a pivotally supported location, said pin seating through an arcuate and height extending aperture defined in at least one of first and second spaced apart support plates and defining a pivotal range of said hook;

a cable including an outer sheath extending from a remote location, said sheath securing to a fixed location of said plate and exhibiting a central gap through which projects a linearly displaceable inner cable portion, and end of which is secured upon a cap in turn supported upon said pin extending from said cam and such that, upon displacement, overcoming a reverse force exerted by said torsion spring to disengage said hook from said striker; and a pair of bushing assemblies including inner grommets which extend into enlarged mounting apertures associated with said plates such that an annular space is defined between an exterior perimeter surface of each grommet and an inner perimeter surface of each mounting aperture, an open interior of each grommet receiving a mounting fastener extending from a frame location of the seat for securing said plates to the seat and providing a degree of at least one of vertical and lateral adjustability for aligning said latch assembly with the floor mounted striker.

* * * * *